United States Patent Office 3,767,776
Patented Oct. 23, 1973

3,767,776
PROCESS FOR THE RECOVERY OF IODINE
James Lewis Bradford, Oklahoma City, Okla., assignor to Kerr-McGee Chemical Corp., Oklahoma City, Okla.
No Drawing. Filed Nov. 9, 1971, Ser. No. 197,135
Int. Cl. C01b 11/12
U.S. Cl. 423—475
7 Claims

ABSTRACT OF THE DISCLOSURE

An anion exchange process in which an aqueous alkaline brine containing iodine is contacted with a quaternary ammonium compound whereby the iodine forms a complex with the ammonium compound. The iodine in the complex then is oxidized to the iodate whereby it is readily strippable from the ammonium compound with an aqueous salt solution.

BACKGROUND OF THE INVENTION

It has been known heretofore to extract iodine from naturally occurring brines by acidifying the brine, oxidizing the acidified brine and subsequently liberating the iodine in the elemental state by vaporizing and blowing out the iodine by means of a current of air. Thereafter, the iodine vapors can be separated from the air stream either by absorbing them in a suitable medium or by dissolving them in an agent which chelates the iodine.

While such processes have been successful for treating brines such as sea water, oil well brines or other naturally occurring mildly alkaline brines, a commercially feasible process has not been available heretofore for extracting iodine from strongly alkaline brines.

A more recent method for recovering iodine from brines utilizes an anion exchange resin such as a strongly basic quaternary ammonium compound to recover the iodine. In such a method as practiced heretofore, relatively large quantities of concentrated salt solution are used to recover the iodine from the resin which necessarily results in a very low concentration of iodine in the salt solution.

SUMMARY OF THE INVENTION

The present invention relates to a process for recovering iodine from alkaline brines. More particularly, this invention is directed to an anion exchange process wherein an aqueous alkaline solution containing iodine is contacted with quaternary ammonium compound whereby the iodine forms a complex with the ammonium compound. The complex is separated from the aqueous solution and the iodine contained therein then is oxidized to the iodate oxidation state. The oxidation of iodine to the iodate provides a species that is readily strippable from the quaternary ammonium compound using an aqueous salt solution. The iodate thus recovered can be converted to elemental iodine.

DESCRIPTION OF THE PREFERRED EMBODIMENT

The present invention provides a method for recovering iodine from an alkaline brine having a pH greater than about 7. Particularly good results are obtained when the brine has a pH within the range of from 7 to 12. In accordance with the present invention, the aqueous alkaline brine is contacted with a quaternary ammonium compound. Preferably, the quaternary ammonium compound is dissolved in an organic diluent. If such a diluent is used, the quaternary ammonium compound and the iodine will form a complex in an organic phase which is separate from an aqueous phase. The organic phase then is separated and the iodine contained therein is oxidized to the iodate. The iodate species of iodine is then readily stripped from the organic phase using an aqueous salt solution.

The present invention is applicable to any iodine-containing brine such as, for example, sea water and the like. However, it is particularly applicable to strongly alkaline brines such as those found at Searles Lake, Calif., for example.

Quaternary ammonium compounds applicable to the present invention are those having the general formula

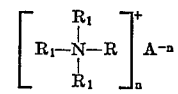

wherein R and $R_1$ are hydrocarbon radicals. R is a lower alkyl group having 1 to 14 carbon atoms and each of the $R_1$'s which may be alike or different, is a long chain aliphatic group having from 8 to 18 carbon atoms. A preferred group of quaternary ammonium compounds are those containing a total of from about 11 to 40 carbon atoms. A is an anion (other than iodine) such as chloride, bromide and the like and $n$ is an integer equal to the valence of the anion A. Chloride is a preferred anion.

Examples of such quaternary ammonium compounds include dilauryl dimethyl ammonium chloride, tricaprylyl monomethyl ammonium chloride, lauryl trimethyl ammonium chloride, palmityl trimethyl ammonium chloride and the like.

According to another embodiment, the quaternary ammonium compound may be in the form of an anion exchange resin such as, for example, Dowex 21K (a commercially available anion exchange resin), and those disclosed in U.S. Pat. 2,591,573. Such compounds are well known to those skilled in the art and have been used heretofore for the recovery of valuable ions.

According to a preferred embodiment, the quaternary ammonium compound is dissolved in an organic diluent, the diluent being any of those generally known to those skilled in the art. The essential requirement is that it should be substantially water-immiscible and inert with respect to the quaternary ammonium compound. Examples of suitable organic diluents include hydrocarbons such as kerosene, hexane, cyclohexane, octane and the like. Chlorinated and aromatic hydrocarbon diluents may also be utilized. Examples of such include chloroform, benzene, toluene, xylene and various commercial aromatic petroleum fractions and the like. Further, the organic diluent may include up to about 10% by weight of a modifier. Typical of such modifiers are the long-chain aliphatic alcohols such as tri-decanol. The long-chain aliphatic alcohols are frequently added to the diluent to improve the solubility of the quaternary ammonium compound in the diluent.

As those skilled in the art will appreciate, the quaternary ammonium compounds may be employed in varying quantities. Generally, there will be present at least the stoichiometric amount required for extraction of all the iodine present in the brine as iodide ions. In a commercial process, the quaternary ammonium compound usually will be present in an amount of from about 1% to 50% by weight of the total organic. A preferred range is from 5% to 10% by weight.

The loaded extractant (quaternary ammonium compound-iodide complex in the diluent) is separated from the aqueous phase by virtue of its immiscibility. The iodide in the loaded extractant is oxidized by any suitable oxidant known to those skilled in the art. Examples of such oxidants include chlorine, hypochlorous acid, sodium hypochlorite, manganese dioxide, chlorine dioxide, oxygen, hydrogen peroxide, nitrous acid, dichromate, permanganate and the like. The amount of oxidant utilized will vary depending upon the amount of iodide in the organic phase as well as the presence of any other oxidizable species. It is preferred, of course, that the oxidant be added in at least the stoichiometric amount required to oxidize all the iodide to the iodate. Generally, the oxidant will be added in an amount of from about 105% to 125% of the stoichiometric requirements. As will be appreciated by those skilled in the art, the use of excessive amounts of oxidant could result in a degradation of the quaternary ammonium compound. Hence, only the minimum amount of oxidizer required, for optimum recovery of the iodide, should be utilized. The oxidation may be represented generally by the equation:

$$R_4N^+I + 3[O] \rightleftharpoons R_4N^+IO_3^-$$

It has been found that the oxidation of the iodide contained in the nonaqueous phase to the iodate produces a much more easily and more rapidly stripped species. Further, the maximum concentration of product (iodate) in the aqueous strip solution is limited only by the solubility therein of the iodate.

The oxidized iodine is readily stripped from the extractant with an aqueous salt solution or mixtures thereof. Examples of such solutions include aqueous sodium chloride, sodium sulfate, potassium chloride, potassium sulfate, sodium nitrate and mixtures thereof.

A preferred salt solution is an aqueous solution of sodium chloride, as it is inexpensive and readily available. It has the further advantage of regenerating the quaternary ammonium compound. The stripping may be represented by the equation:

$$R_4N^+IO_3^- \text{ (org)} + A^- \text{ (aq)} \rightleftharpoons R_4N^+A^- \text{ (org)} + IO_3^- \text{ (aq)}$$

where A is a suitable anion such as, for example, chloride.

Elemental iodine may be recovered from the aqueous strip solution by any of several methods well known to those skilled in the art. An example of such a method is reduction of the iodate with sulfur dioxide or sulfites to precipitate the element (iodine) followed by filtration to recover the iodine.

The following examples are set forth to more clearly illustrate but not restrict the instant invention.

EXAMPLE I

An organic phase comprising a mixture of one volume tricaprylyl methyl ammonium chloride, one-half volume of isodecanol and 8.5 volumes kerosene is prepared. The organic phase is mixed thoroughly with an equal volume of an aqueous phase comprising a concentrated natural brine having a pH of from about 10 to 11 and the following constituents:

|  | Approx. wt., percent |
|---|---|
| KCl | 11.4 |
| NaCl | 7.2 |
| $Na_2CO_3$ | 5.9 |
| $Na_2SO_4$ | 2.1 |
| $Na_2B_4O_7$ | 6.1 |
| $Na_3PO_4$ | 1.9 |
| $Na_2S$ | 1.3 |
| Iodine [1] | 0.09 |

[1] Present as iodide.

The mixture then is allowed to stand and an aqueous and an organic phase separate, with an iodide-tricaprylyl methyl ammonium complex present in the organic phase.

The organic phase is separated from the aqueous phase, analyzed and the iodide content determined to be 0.63 gm./liter. The iodide, in the organic phase, then is simultaneously oxidized and stripped by contacting the organic phase with an equal volume of a 20% NaOH solution and bubbling chlorine through it for about 2½ minutes. The organic phase turns a dark brown color, then lightens to a light yellow, indicating all the iodide present has been oxidized to the iodate. Analysis of the organic phase after this treatment shows an iodide content of 0.01 g./l., indicating better than 98.4% of the iodide has been stripped from the organic phase.

EXAMPLE II

An organic phase comprising 5% by weight of a tricaprylyl methyl ammonium chloride extractant in kerosene is prepared and contacted with an equal volume of the brine described in Example 1. The organic phase and the brine (aqueous phase) are agitated and then allowed to separate. The organic phase is separated from the brine, analyzed and the iodide content determined to be 1.25 gm./liter. Various prior art salt stripping solutions are tested for efficacy as compared to the use of an oxidant in accordance with the present invention. Specifically, samples of the organic phase containing the iodide are shaken with equal volumes of the various aqueous solutions of stripping agents for one minute at 25° C. The phases are allowed to separate and the organic phase of each of the samples is analyzed for iodide content; the results are recorded below including the percent iodide stripped from the organic phase into the aqueous phase.

| Stripping agent | Final iodide content of organic phase (gm./l.) | Percent iodide stripped |
|---|---|---|
| 5 M NaCl, 1 M NaOH | 1.19 | 5 |
| 50% NaOH | 1.13 | 9 |
| 3 M NH$_4$Cl, 3 M NH$_4$OH | 1.24 | 1 |
| 5% NaClO | 0.14 | 89 |
| Saturated AlCl$_3$ | 1.16 | 7 |

As shown by the results recorded above, the 5% NaClO (sodium hypochlorite) simultaneously oxidizes and strips 89% of the iodide from the organic phase. Thus, the speed and efficiency of sodium hypochlorite oxidation-stripping is demonstrated.

EXAMPLE III

A series of tests is conducted to verify the stoichiometry of the oxidation reaction represented by the following equation:

$$R_4N^+I^- + 3ClO^- \rightleftharpoons R_4N^+Cl + IO_3^- + 2Cl^-$$

Portions of an organic phase comprising an iodide-loaded tricaprylyl methyl ammonium chloride in an organic diluent are shaken with varying amounts of sodium hypochlorite close to the stoichiometric equivalent. The contacts are of two-minute duration at 40° C.; the results are shown below.

| Sample | Hypochlorite stoichiometry | Final iodide content of organic phase | Percent iodide stripped |
|---|---|---|---|
| Feed | | 1.45 | 0 |
| 1 | 1.00 | 0.58 | 60 |
| 2 | 1.25 | 0.10 | 93 |
| 3 | 2.00 | 0.10 | 93 |

The need for a slight excess of hypochlorite is based on the fact that the loaded extractant contains small amounts of other oxidizable species, e.g., bromide, organic acids, and the like.

EXAMPLE IV

A one-gallon batch of an organic phase comprising an iodide-loaded tricaprylyl methyl ammonium chloride in an organic diluent containing 2.96 g./l I, is simultaneously oxidized and stripped with sodium hypochlorite. A sufficient amount of sodium hypochlorite is added to produce a near colorless organic phase, indicating all the iodide ions have been oxidized to the iodate and stripped from the organic phase. The resultant strip solution is neutralized with HCl and boiled to drive off excess hypochlorite as chlorine. After cooling, the solution is divided into two portions in a 5 to 1 volumetric ratio. The larger portion is reduced to iodide with 1 M NaHSO$_3$. The reduction is self-indicating, in that the intermediate reduction product, free iodine, gives a dark brown color to the solution, whereas the iodide ion is colorless. The reduced portion of the solution is re-oxidized to iodine using the smaller portion of strip solution to produce a dark brown solution containing a large mass of solid free iodine. Filtration and washing yield approximately 10 g. of crude iodine, a yield of approximately 90%. Additional iodine is recovered from the filtrate by extraction with chloroform; essentially complete recovery can be realized in this manner.

EXAMPLE V

A 51 milliliter quantity of Dowex 21K, a commercially available, strongly basic, quaternary ammonium anion exchange resin, is loaded into a buret. The anion exchange resin has a capacity of 1.3 milli-equivalents (meq.) of iodide per milliliter of resin, thus providing a total capacity of 66.3 meq. An aqueous alkaline brine comprising potassium iodide is passed in a downward flow through the resin in a sufficient amount to insure saturation of the resin. The resin is then flushed with 500 milliliters of deionized water to remove interstitial potassium iodide.

A strip-elution solution is prepared consisting of three volumes of a 5.25% by weight sodium hypochlorite solution and one volume of a 4 M NaCl solution. The iodide ion is simultaneously oxidized to the iodate and stripped from the resin with a downward flow of the strip-elution solution through the buret. The stripping is followed visually by the progress of a dark brown band moving down the buret. The iodate-loaded strip solution is collected and the iodate ion reduced to iodide ion with sodium bisulfite. Potentiometric titration for iodide indicates recovery of 66 meq. of iodide, or 99.7% recovery. Thus, the applicability of the instant invention to an anion exchange resin is demonstrated.

What is claimed is:

1. An anion exchange process for the recovery of iodine from an aqueous alkaline brine comprising: contacting the aqueous alkaline brine, containing iodine as iodide, with a quaternary ammonium compound whereby the quaternary ammonium compound and the iodide form a complex; separating the complex from the brine; oxidizing the iodide contained in the complex to the iodate oxidation state; stripping the iodate from the complex with an aqueous salt solution and recovering an iodate containing solution; said quaternary ammonium compound having the general formula

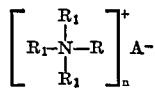

wherein R and $R_1$ are hydrocarbon radicals, R is a lower alkyl group having 1 to 14 carbon atoms, each of the $R_1$'s is a long chain aliphatic group having from 8 to 18 carbon atoms, A is an anion and $n$ is an integer equal to the valence of the anion A.

2. The process of claim 1 wherein the quaternary ammonium compound is a quaternary ammonium anion exchange resin.

3. The process of claim 1 wherein the quaternary ammonium compound is in a substantially water-immiscible organic diluent which is inert with respect to the quaternary ammonium compound whereby said complex is formed in an organic phase.

4. The process of claim 3 wherein the organic diluent contains up to 10% by weight of long-chain aliphatic alcohol.

5. The process of claim 3 wherein the quaternary ammonium compound contains chloride as the anion and the aqueous salt solution is an aqueous solution of sodium chloride.

6. The process of claim 1 wherein the quaternary ammonium compound contains an anion selected from the group consisting of chloride, sulfate, nitrate and bromide.

7. The process of claim 1 wherein the quaternary ammonium compound is a quaternary ammonium chloride in a substantially water-immiscible organic diluent which is inert with respect to the quaternary ammonium compound containing up to 10% by weight of a long-chain aliphatic alcohol and said complex is oxidized and stripped with an aqueous solution of sodium hypochlorite.

References Cited

UNITED STATES PATENTS

| | | | |
|---|---|---|---|
| 2,945,746 | 7/1960 | Shaw | 423—501 |
| 3,352,641 | 11/1967 | Nakamura et al. | 423—501 |
| 3,346,331 | 10/1967 | Nakamura et al. | 423—501 |
| 3,050,369 | 8/1962 | Mills | 423—501 |

OTHER REFERENCES

Kirk-Othmer: "Encyclopedia of Chemical Technology," vol. 11, 2nd ed., John Wiley & Sons, Inc., New York, 1966, pp. 878–80.

HERBERT T. CARTER, Primary Examiner

U.S. Cl. X.R.

423—501